United States Patent Office 3,317,827
Patented May 2, 1967

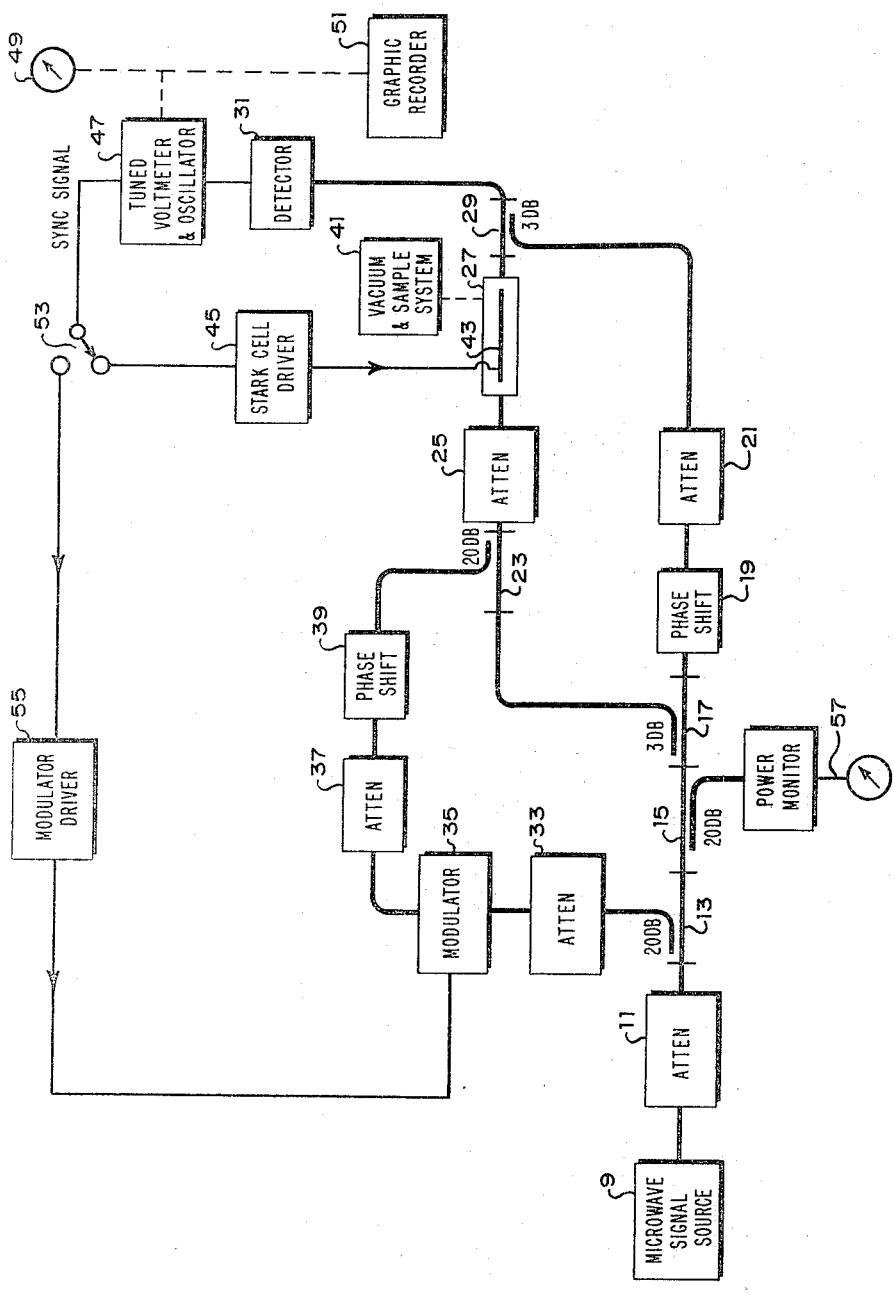

3,317,827
MICROWAVE SPECTROMETER HAVING INDIVIDUALLY ADJUSTABLE REFERENCE AND TEST CHANNELS
Nicholas J. Kuhn, Cupertino, Calif., assignor to Hewlett-Packard Company, Palo Alto, Calif., a corporation of California
Filed Feb. 4, 1964, Ser. No. 342,487
12 Claims. (Cl. 324—58.5)

This invention relates to a microwave spectrometer in which the microwave power applied to the fluid sample in an absorption cell and the microwave power applied to a detector are independently adjustable for high signal sensitivity and versatility. The invention also relates to apparatus in a microwave spectrometer for providing an absolute indication of the absorption coefficient of a fluid sample in an absorption cell.

It is an object of the present invention to provide a microwave spectrometer having an absorption cell in one of a pair of parallel signal paths and having a detector which is common to the two signal paths.

It is another object of the present invention to provide apparatus in a microwave spectrometer for supplying a simulated absorption signal into one of the signal paths to eliminate the effect of detector characteristics upon the accuracy of absorption measurements.

It is another object of the present invention to provide an improved microwave spectrometer which provides an absolute indication of absorption coefficients of a sample under examination and which has extremely high signal sensitivity using a short absorption cell.

In accordance with the illustrated embodiment of the invention a microwave signal having a selected frequency is applied along one signal path to the test sample in an absorption cell (e.g. a Stark-effect absorption cell). The same microwave signal is combined with the signal at the output of the absorption cell in proper phase relationship to cancel substantially the entire microwave signal leaving only a fractional portion of the total microwave power for application to a microwave detector. This permits the power applied to the sample in the absorption cell to be varied over a wide range while the power applied to the detector remains substantially unchanged. The detector responds to variations in the power caused by varying power absorption as the absorption excitation in the absorption cell (e.g. an electrostatic field in a Stark cell) is periodically varied between selected levels of excitation. A third signal arm including a microwave power modulator is connected between the source of microwave signal of selected frequency and the detector to produce a variation in microwave power that is substantially equal to the power variations caused by the varying level of absorption excitation applied to the sample in the absorption cell. An absolute indication of the coefficient of absorption of the sample in the absorption cell is thus provided when the third arm is adjusted to cause the detector to produce an identical reading.

Other incidental objects of the present invention will be apparent from a reading of this specification and an inspection of the accompanying drawing which shows a block diagram of the spectrometer of the present invention.

In the drawing, a source of microwave signal 9 is connected through an attenuator 11 and a series of directional couplers 13–17 to a phase shifter 19 and attenuator 21 which form one of a pair of signal paths. A signal from the auxiliary arm of coupler 17 is applied through a directional coupler 23 and attenuator 25 to the absorption cell 27. The microwave signals at the outputs of each of the absorption cell 27 and attenuator 21 are combined in directional coupler 29 and applied to microwave detector 31. A third signal path applies the signal from the auxiliary arm of coupler 13 through attenuator 33, modulator 35, attenuator 37 and phase shifter 39 to the auxiliary arm of coupler 23.

In operation, a sample of fluid to be examined is introduced into the absorption cell 27 by the vacuum and sample system 41. The level of microwave power in the cell 27 is determined by the attenuators 11 and 25. A Stark cell having an electrode 43 therein for establishing an electrostatic field within the fluid sample is used as the absorption cell where information relating to the dipole moment of molecules in the sample is desired. A Zeeman cell having an electromagnetic coil for establishing a magnetic field within the sample is used where information relating to molecular spin of molecules in the sample is desired. Although the present invention applies both to Zeeman-effect and Stark-effect modulation cells, the following description will refer only to Stark-effect modulation cells for brevity and ease of comprehension. It should be understood therefore that the following description also applies to Zeeman-effect modulation cells.

The sample in the cell 27 shows a resonant rise of power absorption at a selected frequency of the microwave signal from source 9. The frequency at which this peak of power absorption occurs is determined by the strength of the electrostatic field produced by the modulating voltage on the electrode 43. Detector 31 thus responds to changes in the level of power absorption which occur at the frequency of the modulating voltage from Stark cell driver 45.

The output of detector 31 is applied to the tuned voltmeter and oscillator 47 which produces an indication on a meter 49, on a graphic recorder 51, on an oscilloscope, or the like of these changes in microwave power applied to the detector. The oscillator in the tuned voltmeter 47 determines the modulating frequency and determines the frequency about which the voltmeter is tuned.

In order to operate the detector 31 at a power level which is optimum for minimum noise and maximum sensitivity independent of the power in the Stark cell 27, another signal path parallel to the one including the Stark cell is provided between couplers 17 and 29. The attenuators 21 and the phase shifter 19 in this auxiliary path are adjusted to pass substantially the same amount of power as is passed by the Stark cell 27 but in substantially opposite phase relationship. The combination of the two signals in the coupler 29 produces a resultant signal having a microwave power level which is selected for optimum operation of the detector 31. This permits the power in the Stark cell 27 to be adjusted independently of the power level at the detector 31. Where the power level in the Stark cell 27 is lower than the optimum level for detector 31, the power from the absorption cell and from the auxiliary arm may be added by proper adjustment of phase shifter 19.

After an indication of the power absorption in the Stark cell 27 is derived from the output of detector 31, switch 53 is set to apply the signal from the tuned voltmeter and oscillator 47 to the modulator driver 55 which in turn supplies a signal to the modulator 35 to vary the power of the microwave signal conducted thereby. This third arm connected between couplers 13 and 23 and including elements 33–39 supplies a signal to the detector 31 which simulates the amplitude modulation of microwave power caused by power absorption in cell 27 under the periodic Stark-effect modulating field. The phase shifter 39 is adjusted to produce a maximum indication on the meter 49 or recorder 51, etc. and then the attenuation provided by attenuators 33 and 37 is adjusted to provide the same indication on the tuned voltmeter and oscillator 47 as was produced by the Stark-effect modulation in cell 27. The dial settings of attenuators 33 and 37 thus provide an indication of the absorption coefficient of the sample in the Stark cell 27, independent of the characteristics of detector 31 for it is operated at the same power level during each of these measurements.

The third arm including elements 33 to 39 may also be operated simultaneously with the modulation of the Stark cell rather than subsequently, as previously described. In this mode of operation, the amplitude and phase of the signal supplied by the third arm are adjusted to cancel out the modulation effect of the Stark cell and thereby maintain the level of microwave power applied to the detector 31 substantially constant. The dial settings of attenuators 33 and 37 thus provide an indication of the absorption coefficient of the sample in the Stark cell 27. The power monitor 57 indicates the level of power applied to the parallel arms, i.e. indicates substantially twice the power of the signal applied to the Stark cell 27.

The phase angle of the power absorption by the fluid sample in cell 27 may also be determined by adjusting the phase shifter 19 and attenuator 21 to null out the power from cell 27. The phase shifter 19 and attenuator 21 are then adjusted to provide the optimum power level at detector 31 when a new power level of signal at the output of attenuator 21 is equal to the power level of this output at null divided by the cosine of the phase shift angle. This insures that the signal at detector 31 is shifted 90° with respect to the signal at the output of attenuator 21. Detector 31 operating at its optimum power level thus responds primarily to power variations due to changes in the phase angle of power absorption in the cell 27.

I claim:
1. A high frequency spectrometer comprising:
a source of high frequency signal;
an absorption cell including an element disposed to produce an absorption-exciting field in a sample within the absorption cell, said element being connected to a source of absorption-exciting modulating signal;
means including said absorption cell connected to said source of high frequency signal to form a first signal path;
apparatus for varying the amplitude and phase of signals applied thereto;
means including said apparatus connected to said source of high frequency signal to form a second signal path;
a detector for producing an output signal in response to the power of high frequency signal applied thereto;
said detector having an operating power level for which the ratio of output signal to noise is maximum;
means connected to said first and second signal paths for combining the signals thereon to form a resultant signal having a power level substantially equal to said operating power level of said detector; and
apparatus connected to one of the first and second signal paths for applying thereto a signal having a plurality of power levels related to the power levels of signal produced at the output of said absorption cell by the absorption-exciting modulating signal applied to said element of said cell.

2. A high frequency spectrometer as in claim 1:
wherein said last-named apparatus includes a signal-controlled attenuator and a phase shifter connected between the output of said source of high frequency signal and the high frequency signal input of said absorption cell; and
said signal-controlled attenuator is connected to receive a controlling signal related to said absorption-exciting modulating signal.

3. A high frequency spectrometer comprising:
a source of high frequency signal;
an absorption cell including an element disposed to produce an absorption-exciting field in a sample within the absorption cell;
a source of absorption-exciting modulating signal connected to said element;
means including said absorption cell connected to said source of high frequency signal to form a signal path;
a detector for producing an output signal in response to the power of high frequency signal applied thereto;
means connecting the output of the absorption cell to said detector; and apparatus connected to said signal path for applying thereto a signal having a plurality of power levels related to the power levels of signal produced at the output of said absorption cell by the absorption-exciting modulating signal applied to said element.

4. A high frequency spectrometer comprising:
a source of high frequency signal;
a Stark cell having an electrode therein connected to a source of Stark-effect modulating signal;
means including said Stark cell connected to said source of high frequency signal to form a first signal path;
apparatus for varying the amplitude and phase of signal applied thereto;
means including said apparatus connected to said source of high frequency signal to form a second signal path;
a detector for producing an output signal in response to the power of high frequency signal applied thereto;
said detector having an operating power level for which the ratio of output signal to noise is maximum;
means connected to said first and second signal paths for combining the signals thereon to form a resultant signal having a power level substantially equal to said operating power level of said detector;
apparatus for producing a simulating signal having a plurality of power levels related to the power levels of signal produced at the output of said Stark cell by the Stark-effect modulating signal applied to said electrode therein, the power levels of said simulating signal varying at the frequency of said Stark-effect modulating signal;
and means connecting said last-named apparatus to one of the first and second signal paths for applying said simulating signal thereto.

5. A spectrometer comprising:
a source for producing an electromagnetic radiation signal;
sample holding means including an element for producing an excitation field in a sample held in the sample holding means;
detecting means producing an output in response to application of an electromagnetic radiation signal thereto;
means including said sample holding means and forming a first signal path between said source and said detecting means for applying to said detecting means a first electromagnetic radiation signal which is changed from the electromagnetic radiation signal from said source by the interaction of said excitation field with the sample held in said sample holding means;
means forming a second signal path between said source and said detecting means for applying to said detecting means a second electromagnetic radiation signal of selected magnitude and phase relative to said first electromagnetic radiation signal, said detecting means producing an output in response to the resultant of electromagnetic radiation signals applied thereto; and
modulating means coupled to the sample holding means and to the means forming the second signal path for time-varying the electromagnetic radiation signal change produced by the interaction of said excitation field with the sample held in said sample holding means and for time-varying said second electromagnetic radiation signal, the selected parameters of the second electromagnetic radiation signal relative to corresponding parameters of the first electromagnetic radiation signal which provided a selected output from the detector means providing an indication of the electromagnetic radiation signal change produced by the interaction of said excitation field with the sample held in said sample holding means.

6. A spectrometer as in claim 5 including an auxiliary signal path between said source and said detecting means for applying to said detecting means a third electromagnetic radiation signal of selected magnitude and phase relative to said first electromagnetic radiation signal to provide a power level of the resultant of electromagnetic radiation signals applied to said detecting means which is within a selected operating range of power levels for said detector means.

7. A spectrometer comprising a source of electromagnetic radiation signal;
a sample-holding absorption cell having an element for producing an excitation field in a sample held within the cell;
apparatus connected to said element for producing a time-varying electromagnetic radiation signal absorption field in the sample within the cell;
a first signal path including the sample-holding absorption cell connected to said source for applying electromagnetic radiation signal to the sample in the cell;
a second signal path connected to said source for altering the amplitude and phase of electromagnetic radiation signal applied thereto;
a detector which has a selected operating range of applied electromagnetic radiation signal power connected to receive the combination of signals from the first and second signal paths;
a circuit for coupling to the detector a calibrating, electromagnetic radiation signal field of known time-varying magnitude; and
the amplitude and phase of signal from the second path being selected relative to the amplitude and phase of signal from the first path to provide resultant signal power at the detector which is within said selected operating range for providing an indication of the change in electromagnetic radiation signal transmitted through the cell due to interaction with the time-varying absorption-exciting field applied to the sample within the cell and an indication of the time-varying change of magnitude of the calibrating electromagnetic radiation signal field.

8. A spectrometer as in claim 7 wherein: the selected operating range for the detector is selected about a power level for which the signal-to-noise ratio is a maximum.

9. A spectrometer as in claim 7 wherein:
the sample-holding absorption cell is a Stark cell having an electrode therein for producing a time-varying electrostatic absorption-exciting field within the sample in response to a time-varying voltage applied to the electrode.

10. A spectrometer as in claim 7 wherein:
the circuit for coupling the calibrating electromagnetic radiation signal field to the detector includes another signal path for applying an electromagnetic radiation signal to one of the first and second signal paths with power levels proportional to the power levels of electromagnetic radiation signal transmitted through the cell in response to the interaction with the time-varying absorption-exciting field applied to the sample.

11. A spectrometer as in claim 10 wherein:
said other signal path is connected to said source for combining with the electromagnetic radiation signal applied to the sample-holding absorption cell another signal which has a power level that varies with time at the same rate as the time-varying field applied to the sample within the cell.

12. A spectrometer as in claim 11 wherein the limits of power level variations with time of the electromagnetic radiation signal applied to the sample-holding absorption cell by the third signal path are substantially equal and opposite in phase to the variations with time in the power level of electromagnetic radiation signal transmitted through the sample-holding absorption cell due to interaction with the absorption-exciting field applied to the sample such that the power level of electromagnetic radiation signal at the output of the sample-holding absorption cell is substantially constant as the absorption-exciting time-varying field is applied to the sample within the cell.

References Cited by the Examiner

Review of Scientific Instruments, vol. 32, No. 1, January 1961, pp. 36–40, "Balanced Mixer Spectrometer."

WALTER L. CARLSON, *Primary Examiner.*

A. E. RICHMOND, P. F. WILLE,
*Assistant Examiners.*